(12) United States Patent
Dai et al.

(10) Patent No.: US 10,829,378 B1
(45) Date of Patent: Nov. 10, 2020

(54) MODIFIED NANO GRAPHITE AND POLYMER COMPOSITE MATERIAL THEREOF, PREPARATION METHOD AND USE IN HIGH TEMPERATURE AND HIGH SALINITY OIL RESERVOIR

(71) Applicants: China University of Petroleum (East China), Qingdao (CN); Shengli Oilfield Branch, China Petroleum & Chemical Co., Ltd, Dongying (CN); Northwest Oilfield Branch, China Petroleum & Chemical Co., Ltd, Xinjiang Uygur Autonomous (CN); China University of Geosciences (Beijing), Beijing (CN)

(72) Inventors: Caili Dai, Qingdao (CN); Guang Zhao, Qingdao (CN); Yahui Lv, Qingdao (CN); Zenglin Wang, Qingdao (CN); Long He, Qingdao (CN); Liang Li, Beijing (CN); Qing You, Beijing (CN); Chenglin Gu, Beijing (CN)

(73) Assignees: CHINA UNIVERSITY OF PETROLEUM (EAST CHINA), Qingdao (CN); SHENGLI OILFIELD BRANCH, CHINA PETROLEUM & CHEMICAL CO., LTD, Dongying (CN); NORTHWEST OILFIELD BRANCH, CHINA PETROLEUM & CHEMICAL CO., LTD, Urumqi (CN); CHINA UNIVERSITY OF GEOSCIENCES (BEIJING), Beijing (CN)

(*) Notice: Subject to any disclaimer, the term of this patent is extended or adjusted under 35 U.S.C. 154(b) by 0 days.

(21) Appl. No.: 16/751,424

(22) Filed: Jan. 24, 2020

(30) Foreign Application Priority Data

Nov. 1, 2019 (CN) .......................... 2019 1 1059811
Jan. 17, 2020 (CN) .......................... 2020 1 0054808

(51) Int. Cl.
*C01B 32/21* (2017.01)
*C08F 20/56* (2006.01)
(Continued)

(52) U.S. Cl.
CPC ............ *C01B 32/21* (2017.08); *C01B 32/205* (2017.08); *C08F 20/56* (2013.01); *C08K 3/042* (2017.05)

(58) Field of Classification Search
CPC .................................................. C07D 491/04
See application file for complete search history.

(56) References Cited

U.S. PATENT DOCUMENTS

2013/0264121 A1* 10/2013 Young .................... C09K 8/035
                                                              175/65
2019/0144284 A1*  5/2019 Blanford ............... C01B 32/194
                                                             423/415.1

FOREIGN PATENT DOCUMENTS

| CN | 105097066 B | 11/2015 |
| CN | 110551388 A | 12/2019 |
| CN | 110564100 A | 12/2019 |

OTHER PUBLICATIONS

English translation of abstract of CN 108314031 A, published Jul. 24, 2018 (Year: 2018).*

(Continued)

*Primary Examiner* — Alicia Bland
(74) *Attorney, Agent, or Firm* — Volpe Koenig

(57) ABSTRACT

A modified nano graphite, a polymer composite material of the modified nano graphite, and use of the polymer composite material in a high temperature and high salinity oil reservoir.

8 Claims, 1 Drawing Sheet

(51) Int. Cl.
*C01B 32/205* (2017.01)
*C08K 3/04* (2006.01)

(56) References Cited

OTHER PUBLICATIONS

English translation of abstract of CN 108046252 A, published May 18, 2018 (Year: 2018).*
English translation of abstract of CN 110054965 A, published Jul. 26, 2019 (Year: 2019).*
Chemical functionalization of graphene oxide toward the tailoring of the interface in polymer composites; Composites Science and Technology 77(2013) 87-94.
The Effect of Surface Treatment on Graphite Nanoplatelets Used in Fiber reinforced Composites; Journal Applied Polymer Science, 2014, 39994-34004.
Preparation of Graphene Oxide/Polyacrylamide Composite Material and Its Oil-displacing Performance; China Academic Journal Electronic Publishing House. 1994-2018.

* cited by examiner

MODIFIED NANO GRAPHITE AND POLYMER COMPOSITE MATERIAL THEREOF, PREPARATION METHOD AND USE IN HIGH TEMPERATURE AND HIGH SALINITY OIL RESERVOIR

PRIORITY CLAIM & CROSS REFERENCE

The application claims priority to Chinese Application No. 201911059811.8, filed on Nov. 1, 2019, entitled "modified nano graphite and composite material thereof, preparation method and use in high temperature and high salinity oil reservoir", and Chinese Application No. 202010054808.3, filed on Jan. 17, 2020, entitled "modified nano graphite and polymer composite material thereof, preparation method and use in high temperature and high salinity oil reservoir", which is herein specifically and entirely incorporated by reference.

FIELD

The present disclosure relates to the field of oilfield chemistry, and particularly relates to modified nano graphite, a polymer composite material of the modified nano graphite, and use of the polymer composite material in high temperature and high salinity oil reservoir.

BACKGROUND

With the rapid increase of national economy, the demand for petroleum resources is continuously increased, and the further improvement of crude oil exploitation is imminent.

High temperature (100-150° C.) and high salinity (5-30 ten thousand mg/l) oil reservoirs are the key points of oil field development in China, but the heterogeneity of the oil reservoirs still exists in the oil reservoirs. The improvement of the recovery ratio needs to regulate and control the heterogeneity of the stratum, and a chemical regulation and control technology mainly comprising polymer, binary combination flooding of polymer/surfactant, ternary combination flooding of polymer/surfactant/alkali and polymer jelly is an important technical means for realizing the improvement of the heterogeneity of the reservoir. However, for the fatal problem of poor temperature resistance and salt tolerance of the polymer under the severe high temperature and high salinity oil reservoir conditions, the exiting polymer flooding and the recovery efficiency improving technology established on the basis of the polymer are difficult to meet the urgent requirements of further development of the high temperature and high salinity oil reservoir, and the development effect of the oil reservoir is reduced.

Therefore, the research and development of the polymer which is suitable for the high temperature and high salinity oil reservoir to provide the recovery factor have important significance.

SUMMARY

To overcome the defect that polymers in the exiting art are not suitable for high temperature and high salinity oil reservoirs or have low recovery rate, and provides a modified nano graphite, a polymer composite material of the modified nano graphite, a preparation method of the polymer composite material, and use of the polymer composite material in the high temperature and high salinity oil reservoirs.

In a first aspect, the present disclosure provides a modified nano graphite, wherein the modified nano graphite has a structure represented by formula (1);

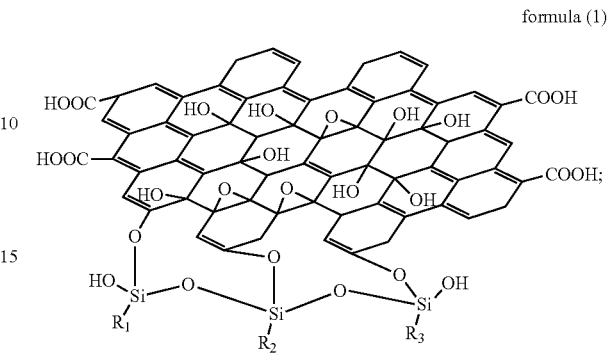

formula (1)

wherein, $R_1$, $R_2$ and $R_3$ are vinyl or propenyl, respectively.

In a second aspect, the present disclosure provides a polymer composite Material having a structure represented by formula (4);

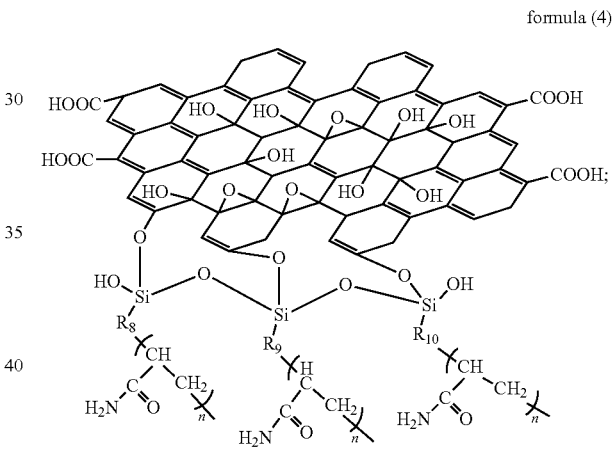

formula (4)

wherein $R_8$, $R_9$, and $R_{10}$ are vinyl or propenyl, respectively;

wherein n is an integer of 56000-150000;

wherein the weight average molecular weight of the polymer composite material is 400-1000 ten thousand.

In a third aspect, the present disclosure provides a method of polymer composite material being used in high temperature and high salinity oil reservoirs, wherein the polymer composite material was described above.

Through the technical scheme, compared with the exiting art, the present disclosure has the following advantages:

(1) the polymer composite material for improving the recovery ratio of the high temperature and high salinity oil reservoir is suitable for oil reservoir conditions with the temperature of 130-150° C. and the mineralization degree of 5-30 ten thousand mg/L, and the viscosity retention rate of 30 days is more than or equal to 50%.

(2) The polymer composite material for improving the recovery ratio of the high temperature and high salinity oil reservoir is prepared by adopting an in-situ polymerization method, a redox initiation system initiated at low temperature is adopted for reaction, high temperature operation is not required for the reaction, and the polymer composite material is safe, energy-saving, environment-friendly and stable in reaction process.

(3) The polymer composite material reaction system for improving the recovery ratio of the high temperature high salinity oil reservoir has the characteristics of wide raw material source, low price, good compatibility among all components, soft texture of the adopted modified nano graphite particles, self lubrication and thermal stability.

(4) The polymer composite material solution for improving, the recovery ratio of the high temperature high salinity oil reservoir is simple to prepare, can be used for preparing clear water or formation water with the mineralization degree of less than or equal to 30 ten thousand mg/L, and solves the problem of shortage of fresh water resources in the complex and harsh construction processes of mudflats, deserts and the like.

DESCRIPTION OF THE REFERENCE NUMERALS

Figure 1:
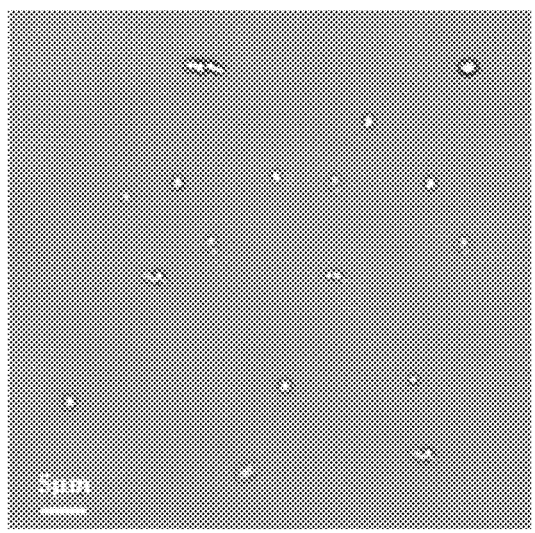
FIG. 1 is a high magnification transmission electron micrograph of the modified nano graphite prepared in Example 1 of the present disclosure.

1—oxidized nano graphite;
2—modified nano graphite;
3—polymer composite material.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a modified nano graphite, wherein the modified nano graphite has a structure shown in a formula (1);

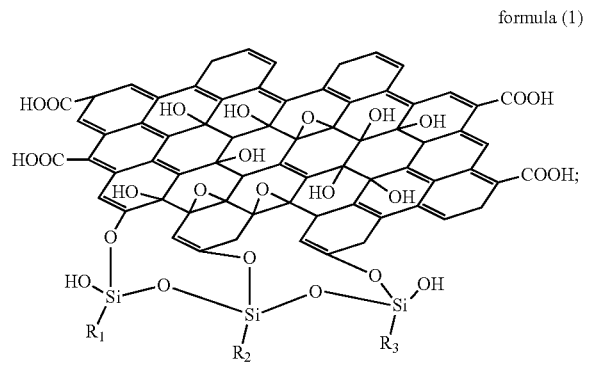

formula (1)

wherein $R_1$, $R_2$ and $R_3$ are vinyl or propenyl, respectively.

According to the present disclosure, it is preferable that $R_1$, $R_2$ and $R_3$ are vinyl, respectively, that is, in the present disclosure, the modified nano graphite has a structure represented by formula (5);

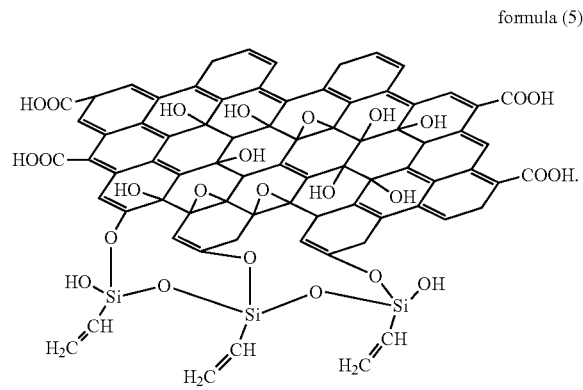

formula (5)

According to the disclosure, the sheet diameter of the modified nano graphite is 0.5-5 μm, and the thickness is 1-3 nm.

According, to the disclosure, the present disclosure provides a method for preparing modified nano graphite, including:

(a) dispersing a monomer shown in a formula (2) in deionized water to obtain a dispersion liquid;

(b) contacting the dispersion liquid with a monomer shown in a formula (3) to obtain a modified nano graphite solution;

(c) washing and drying the modified nano graphite solution to obtain a drying products, then grinding and dispersing the drying products to obtain modified nano graphite;

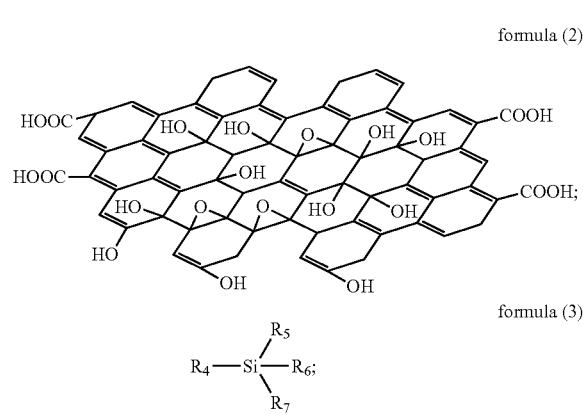

formula (2)

formula (3)

wherein $R_4$ is vinyl or propenyl, preferably vinyl;

wherein $R_5$, $R_6$ and $R_7$ are methoxy, ethoxy or β-methoxyethoxy, respectively, respectively.

According to the present disclosure, preferably $R_4$ is vinyl; $R_5$, $R_6$ and $R_7$ are methoxy, ethoxy or β-methoxyethoxy, respectively; in the present disclosure, when $R_4$ is vinyl; when $R_5$, $R_6$ and $R_7$ are ethoxy, respectively, the structure of the monomer shown in the formula (3) is shown m a formula (6);

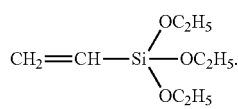

formula (6)

Preferably, in the present disclosure, when $R_4$ is vinyl, $R_5$, $R_6$ and $R_7$ are methoxy, respectively, the monomer represented by the formula (3) is vinyl trimethoxysilane.

Preferably, in the present disclosure, when $R_4$ is vinyl, $R_5$, $R_6$, and $R_7$ are β-methoxyethoxy, respectively, the monomer represented by formula (3) is vinyl tris (alkenylmethoxyethoxy) silane.

More preferably, $R_4$ is vinyl; $R_5$, $R_6$ and $R_7$ are ethoxy, respectively.

According to the present disclosure, the monomer shown in the formula (3) is selected from vinyl triethoxysilane, vinyl trimethoxysilane or vinyl tris (β-methoxyethoxy)silane; more preferably vinyl triethoxysilane.

According to the present disclosure, the monomer shown in formula (2) is oxidized nano graphite, namely unmodified nano graphite, also called as bulk nano graphite, in the present disclosure, the oxidized nano graphite is prepared by a exiting Hummers method, wherein the sheet diameter of the oxidized nano graphite is 0.5-5 μm, and the thickness is 1-3 nm.

According to the present disclosure, in step (a), the conditions of dispersion comprise: the stirring speed is 400-800 rpm, the ultrasonic power is 300-800 W, the temperature is 15-25° C., and the time is 1-6 h; preferably, the stirring speed is 500-600 rpm, the ultrasonic power is 500-600 W, the temperature is 20-25° C., and the time is 2-4 h.

According to the present disclosure, in step (h), the conditions of the contacting comprise: the stirring speed is 400-800 rpm, the temperature is 60-80° C., and the time is 6-8 h; preferably, the stirring speed is 500-600 rpm, the temperature is 65-75° C., and the time is 6.5-7.5 h.

According, to the present disclosure, in step (c), the drying conditions comprise: the temperature is 35-50; washing with a mixed solution of deionized water and ethanol; wherein the volume ratio of the deionized water to the ethanol in the mixed solution is 1:(1-1.5); preferably 1:1.

According to the present disclosure, the weight ratio of the monomer shown in the formula (2), the monomer shown in the formula (3) and the deionized water is (1-2.5):(0.1-0.25): 100.

According to a preferred embodiment of the present disclosure, the method for preparing the modified nano graphite comprises:

at room temperature 15-25° C., firstly adding oxidized nano graphite powder with the sheet diameter of 0.5-5 μm and the thickness of 1-3 nm into deionized water, stirring for 30-60 min under the condition that the stirring speed is 400-800 rpm, and performing ultrasonic dispersion for 1-6 h under the condition that the ultrasonic power is 300-800 W to obtain an oxidized nano graphite dispersion liquid; adding the monomer silane coupling agent shown in the formula (3) while stirring, and continuously stirring for 6-8 h at the water bath temperature of 60-80° C. to obtain a modified nano graphite solution; the solution obtained above was mixed in a ratio of 1:1, washing three times by using mixed liquid of deionized water and alcohol, and removing unreacted silane coupling agent; and drying the washed solution in 35° C. oven, and grinding and dispersing to obtain the modified nano graphite particles.

According to the present disclosure, the present disclosure provides a modified nano graphite prepared by the method describe above.

In a second aspect, the present disclosure provides a polymer composite material having a structure represented by formula (4);

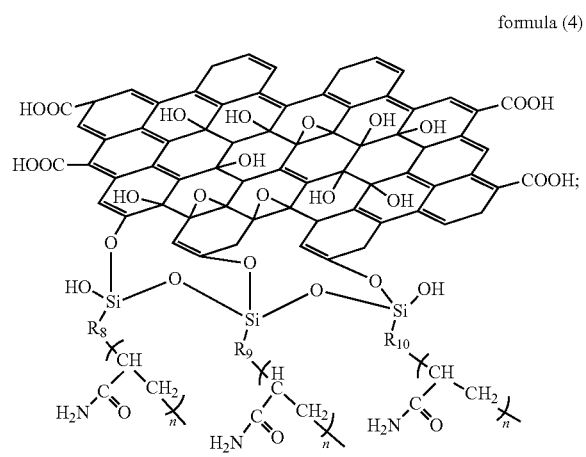

formula (4)

wherein $R_8$, $R_9$ and $R_{10}$ are vinyl or propenyl, respectively;

wherein n is an integer of 56000-150000;

wherein the weight average molecular weight of the polymer composite material is 400-1000 ten thousand.

According to the present disclosure, the degree of hydrolysis of the polymer composite material is between 2-10%, preferably between 3-7%.

According to the present disclosure, $R_8$, $R_9$, and $R_{10}$ are vinyl, respectively; wherein n is an integer of 70000-420000.

In the present disclosure, it is to be noted that m and n may be any integers within the defined interval.

According to the present disclosure, the weight average molecular weight of the polymer composite material is preferably 500-800 ten thousand, and more preferably 600-700 ten thousand.

According to the present disclosure, the present disclosure provides a method for preparing a polymer composite material, wherein the method comprises: in a redox initiation system, a modified nano graphite with the structure shown in the formula (1) is contacted with an acrylamide monomer for polymerization reaction to obtain the polymer composite material shown in the formula (4);

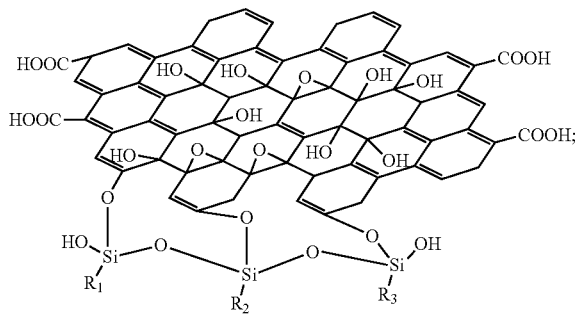

formula (1)

wherein, $R_1$, $R_2$ and $R_3$ are vinyl or propenyl, respectively;

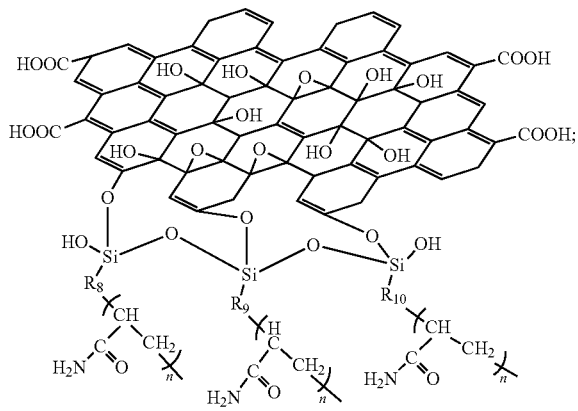

formula (4)

wherein $R_8$, $R_9$ and $R_{10}$ are vinyl or propenyl, respectively;

wherein n is an integer of 56000-150000.

According to the present disclosure, the redox initiation system comprises reducing agent and oxidizing agent, wherein the reducing agent is one or more selected from the group consisting of sodium bisulfite, sodium sulfite and ferrous ions; the oxidizing agent is one or more selected from the group consisting of ammonium persulfate, potassium persulfate and sodium persulfate.

According to the present disclosure, based on 100 parts by weight of deionized water, the reducing, agent is 0.05 to 0.3 parts by weight, the oxidizing agent is 0.05 to 0.3 parts by weight, the modified nano graphite with the structure shown in the formula (3) is 0.01 to 0.05 parts by weight, the acrylamide monomer is 20 to 30 parts by weight, and in the present disclosure, the sum of the amounts of the components is 100 parts by weight.

Preferably, based on 100 parts by weight of deionized water, the reducing agent is 0.1 to 0.2 parts by weight, the oxidizing agent is 0.1 to 0.2 parts by weight, the modified nano graphite with the structure shown in the formula (1) is 0.02 to 0.04 parts by weight, the acrylamide monomer is 25 to 28 parts by weight, and in the present disclosure, the sum of the amounts of the components is 100 parts by weight.

According to the present disclosure, the polymerization conditions comprise: the temperature is 30-45° C. and the time is 2-5 h; preferably, the temperature is 35-40° C. and the time is 3-4 h.

According to the present disclosure, the polymerization reaction is preferably carried out under stirring conditions, wherein the stirring speed is 400-800 rpm, preferably 500-600 rpm.

According, to the present disclosure, the polymerization is preferably carried out under nitrogen, with a nitrogen flow of 1-10 mL/min, preferably 5-8 mL/min.

According to the present disclosure, the method for preparing the polymer composite material further comprises: washing and drying a product obtained after the polymerization reaction to obtain a rubber block; and crushing and screening the rubber blocks.

In the present disclosure, a product obtained after the polymerization reaction is washed by adopting a washing solution, wherein the washing solution comprises water and ethanol; the drying is not particularly limited, and may be performed in an oven at 35-50° C. In addition, in the present disclosure, the slab is pulverized using a grinder, and is sieved using a sieve of 45-149 μm.

According to a preferred embodiment of the present disclosure, the method for preparing the polymer composite material comprises:

At room temperature 15-25° C., firstly adding the modified nano graphite particles into deionized water, and stirring for 30-50 min under the condition that the stirring speed is 500-600 rpm to obtain a uniformly dispersed solution; adding acrylamide monomer while stirring, continuously introducing nitrogen for 30-45 min, stirring for 40 min, and controlling the reaction temperature to be 40° C.; adding sodium bisulfite, stirring for 5 min, adding ammonium persulfate, mixing uniformly, and reacting for 3-4 h; after the reaction is finished, washing the product with a washing solution for three times, drying, in a 35° C. oven, taking, out the rubber block, crushing and sieving to obtain the polymer composite material.

According to the present disclosure, the present disclosure provides a polymer composite material prepared by the method described above.

In a third aspect, the present disclosure provides a method of polymer composite material being used in high temperature and high salinity oil reservoirs, wherein the composite material was described above.

The present disclosure will be described in detail below by way of examples.

In the following examples and comparative examples:

The high magnification electron micrograph parameters were measured by a high-speed photomicrograph system of the type DMi8C, available from diesel instruments ltd.

The fourier infrared plots were measured by an infrared spectrometer, model VERTEX available from brueck, germany.

The apparent viscosity was measured by HAAKE-RS6000, model number available from Bruk, Germany.

Vinyl triethoxysilane, vinyl trimethoxysilane, vinyl tris (β-methoxyethoxy) silane, acrylamide, sodium bisulfite, sodium sulfite, ferrous ions and ammonium persulfate, potassium persulfate and sodium persulfate starting materials are commercially available from the Michael corporation.

Example 1

This example illustrates the modified nano graphite prepared by the method of the present disclosure.

The method comprises the following steps: at room temperature 15° C., firstly adding 0.5 g of oxidized nano graphite powder with the sheet diameter of 1 μm and the thickness of 2 nm into 20 g of deionized water, stirring for 30 min under the condition that the stirring speed was 600 rpm, and performing ultrasonic dispersion for 3 h under the condition that the ultrasonic power was 600 W to obtain an oxidized nano graphite dispersion liquid; adding 0.05 g of vinyl triethoxysilane coupling agent while stirring, and continuously stirring for 8 h at the water bath temperature of 80° C. to obtain a modified nano graphite solution; washing the obtained solution with a mixed solution of deionized water and alcohol in a ratio of 1:1 for three times, and removing unreacted silane coupling agent; and drying the washed solution in a 35° C. oven, and grinding and dispersing.

The modified nano graphite particles with the sheet diameter of 1 μm and the thickness of 2 nm were obtained, and the structure of the modified nano graphite particles was shown as the formula (5).

Example 2

This example illustrates the modified nano graphite prepared by the method of the present disclosure.

The method comprises the following steps: at room temperature 25° C., firstly adding 0.2 g of oxidized nano graphite powder with the sheet diameter of 1.5 μm and the thickness of 3 nm into 20 g of deionized water, stirring for 45 mM under the condition that the stirring speed was 500 rpm, and performing ultrasonic dispersion for 3 h under the condition that the ultrasonic power was 500 W to obtain an oxidized nano graphite dispersion liquid; adding 0.02 g of vinyl triethoxysilane coupling agent while stirring, and continuously stirring for 3 h at the water bath temperature of 60° C. to obtain a modified nano graphite solution; washing the obtained solution for 3 times by using a mixed solution of deionized water and alcohol in a ratio of 1:1, and removing unreacted silane coupling agent; and drying the washed solution in an oven at 50° C., and grinding and dispersing.

The result obtained were modified nano graphite particles with the sheet diameter of 1.5 μm and the thickness of 3 nm, and the structure of the modified nano graphite particles was shown as the formula (5).

Example 3

This example illustrates the modified nano graphite prepared by the method of the present disclosure.

The method comprises the following steps: at room temperature 25° C., firstly adding 0.3 g of oxidized nano graphite powder with the sheet diameter of 0.5 μm and the thickness of 1 nm into 20 g of deionized water, stirring for 30 min under the condition that the stirring speed was 550 rpm, and performing ultrasonic dispersion for 3.5 h under the condition that the ultrasonic power was 550 W to obtain an oxidized nano graphite dispersion liquid; adding 0.03 g of vinyl triethoxysilane coupling agent while stirring, and continuously stirring for 7 h at the water bath temperature of 70° C. to obtain a modified nano graphite solution; washing the obtained solution for 3 times by using a mixed solution of deionized water and alcohol in a ratio of 1:1.5, and removing unreacted silane coupling agent; and drying the washed solution in an oven at 45° C., and grinding and dispersing.

As a result, modified nano graphite particles with a sheet diameter of 0.5 μm and a thickness of 1 nm were obtained, and the structure of the modified nano-graphite particles was shown in a formula (5).

Example 4

This example illustrates the polymer composite material prepared by the method of the present disclosure.

The method comprises the following steps: at room temperature 25° C., 0.002 g of the modified nano graphite (sheet diameter 1 μm, thickness 2 nm) prepared in Example 1 was added into 20 g of deionized water, and stirred for 40 min at a stirring rate of 500 rpm to obtain a uniformly dispersed solution; adding 6.0 g of acrylamide monomer while stirring, continuously introducing, nitrogen for 30 min, stirring for 40 min, and controlling the reaction temperature to be 40° C. adding 0.02 g of sodium bisulfite, stirring for 5 min, adding 0.02 g of ammonium persulfate, uniformly mixing, and reacting for 3 h; after the reaction is finished, washing the product with 1:1 ultrapure water and ethanol washing solution for three times, drying in a 35° C. oven, taking out the gel block, crushing and sieving.

As a result, a composite material having a weight average molecular weight of 500 ten thousand g/mol and a degree of hydrolysis of 3.4% was obtained, and the structure thereof was represented by the formula (4), $R_8$, $R_9$ and $R_{10}$ each being a vinyl group, n is 70423.

The transmission electron micrograph of the composite material was shown in FIG. 1, and can be seen from FIG. 1: the modified nano graphite particles were uniformly dispersed in the polymer matrix, and do not agglomerate, so that the uniform polymer nano graphite composite material was formed.

Figure 2:
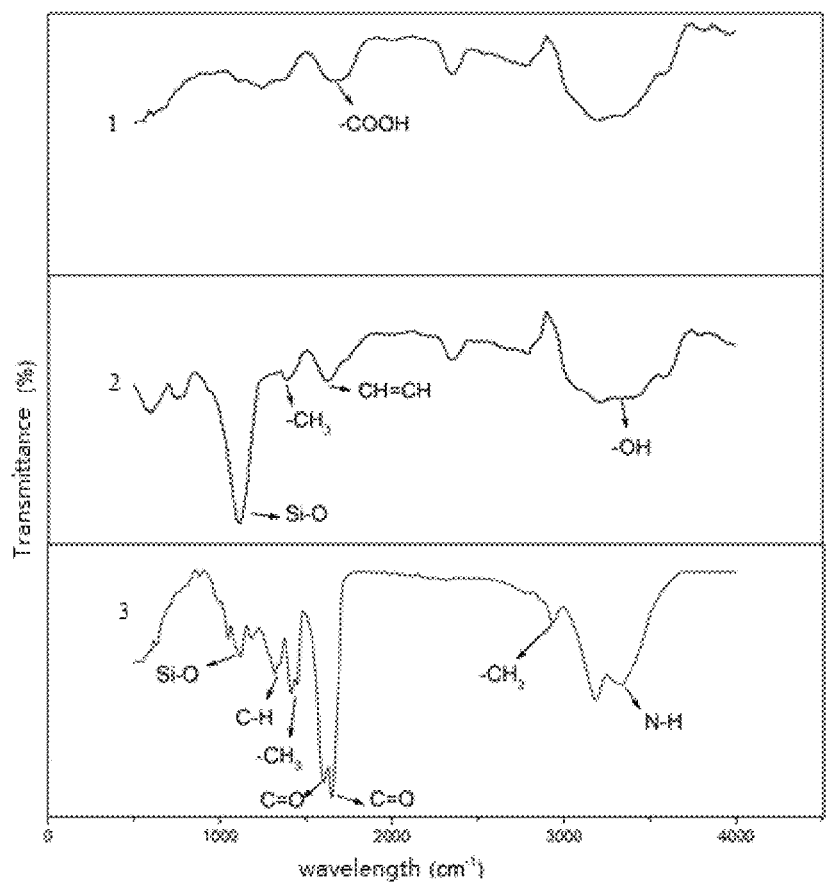
FIG. 2 is a Fourier infrared of the polymer composite material prepared in Example 4 of the present disclosure.

The infrared curve of the composite material was shown in FIG. 2, wherein 1 represents oxidized nano graphite; 2 represents modified nano graphite; 3 represents a composite material; as can be seen from FIG. 2: the modified nano graphite can be successfully synthesized by the silane coupling agent, and the polymer nano graphite composite material can be further synthesized.

In addition, the apparent viscosity of the composite material prepared above was measured by a high temperature high pressure rheometer (shear rate 170 s$^{-1}$) to determine a concentration of 1.5%. The temperature was 130° C., the mineralization degree was 10 ten thousand mg/L (sodium ion were 35759 mg/L, calcium ion were 1000 mg/L magnesium ion were 1000 mg/L) the initial viscosity was 52.4 mPa·s, the viscosity retention rate was 80% when the viscosity was 41.9 mPa·s after aging for 30 days; the temperature was 130° C., the mineralization degree was 30 ten thousand mg/L (sodium ion were 107307 mg/L, calcium on were 3000 mg/L, magnesium ion were 3000 mg/L), the initial viscosity was 50.2 mPa·s, the viscosity after aging for 30 days was 39.1 mPa·s, and the viscosity retention rate was 78%; the initial viscosity of 10 ten thousand mg/L, (sodium ion were 35769 mg/L, calcium were 1000 mg/l, magnesium ion were 1000 mg/L) at the temperature of 150° C., the viscosity after aging for 30 days is 25.7 mPa·s, and the viscosity retention rate was 70%; the initial viscosity of 20 ten thousand mg/L (sodium ion were 71538 mg/L, calcium ion were 2000 mg/L, magnesium ion were 2000 mg/L) at 150° C., the viscosity after aging for 30 days is 23.9 mPa·s, and the viscosity retention rate was 68%.

Example 5

This example illustrates the polymer composite material prepared by the method of the present disclosure.

The method comprises the following steps: at room temperature 25° C., 0.01 g of the modified nano-graphite (sheet diameter 1 μm, thickness 2 nm) prepared in Example 1 was added to 20 g of deionized water, and stirred at a stirring rate of 600 rpm for 45 min to obtain a uniformly dispersed solution; adding 4 g of acrylamide monomer while stirring, continuously introducing nitrogen for 35 min, stirring for 40 min, and controlling the reaction temperature to be 35° C.; adding 0.042 of sodium bisulfite, stirring for 5 min, adding 0.04 g of ammonium persulfate, uniformly mixing, and reacting for 4 h; after the reaction was completed, the product was washed three times with a washing solution and dried in an oven at 35° C., and the gel mass was taken out, pulverized and sieved.

As a result, a polymer composite material having a weight average molecular weight of 600 ten thousand g/mol and a degree of hydrolysis of 3.8% was obtained, and the structure thereof was represented by the formula (4), $R_8$, $R_9$ and $R_{10}$ each being, a vinyl group, n is 84507.

In addition, the apparent viscosity of the polymer composite material prepared above was measured by a high temperature high pressure rheometer (shear rate 170 $s^{-1}$) to determine a concentration of 1.5%. The temperature was 130° C., the mineralization degree was 10 ten thousand mg/L (sodium ion were 35769 mg/L, calcium ion were 1000 mg/L, magnesium ion were 1000 mg/L), the initial viscosity was 49.8 mPa·s, the viscosity retention rate after aging for 30 days was 38.6 mPa·s; the temperature was 130° C. the mineralization degree was 30 ten thousand mg/L (sodium ion were 107307 mg/L, calcium ion were 3000 mg/L, magnesium ion were 3000 mg/L), the initial viscosity was 47.9 mPa·s, the viscosity after aging for 30 days was 35.4 mPa·s, and the viscosity retention rate was 74%; the temperature was 150° C., the mineralization degree was 10 ten thousand mg/L (sodium ion were 35769 mg/L, calcium ion were 1000 mg/L, magnesium ion were 1000 mg/L), the initial viscosity was 34.2 mPa·s, the viscosity after aging for 30 days was 22.2 mPa·s, and the viscosity retention rate was 65%; the initial viscosity of 20 ten thousand mg/L (sodium ion were 71538 mg/L, calcium ion were 2000 mg/L, magnesium ion were 2000 mg/L) at 150° C., the viscosity after aging for 30 days was 1.8.2 mPa·s, and the viscosity retention rate was 60%.

Example 6

This example illustrates the polymer composite material prepared by the method of the present disclosure.

A polymer composite material was prepared in the same method as in Example 4, except that: the modified nano graphite prepared in Example 1 was replaced with the modified nano-graphite prepared in Example 2.

As a result, a polymer composite material having a weight average molecular weight of 800 ten thousand g/mol and a degree of hydrolysis of 4.0% was obtained, and the structure thereof was represented by the formula (4), $R_8$, $R_9$ and $R_{10}$ each being a vinyl group, n is 112676.

In addition, the apparent viscosity of the composite material prepared above was measured by a high temperature high pressure rheometer (shear rate 170 $s^{-1}$) to determine a concentration of 1.5%. The temperature was 130° C., the mineralization degree was 10 ten thousand mg/L (sodium ion were 35769 mg/L, calcium ion were 1000 mg/L, magnesium ion were 1000 mg/L), the initial viscosity was 52.8 mPa·s, the viscosity retention rate after aging for 30 days was 41.7 mPa·s; the temperature was 130° C., the mineralization degree was 30 ten thousand mg/L (sodium ion were 107307 mg/L, calcium ion were 3000 mg/L, magnesium ion were 3000 mg/L), the initial viscosity was 48.1 mPa·s, the viscosity after aging for 30 days was 36.1 mPa·s, and the viscosity retention rate was 75%; the initial viscosity of 10 ten thousand mg/L (sodium ion were 35769 mg/L, calcium ion were 1000 mg/L, magnesium ion were 1000 mg/L) at the temperature of 1150° C., the viscosity after aging for 30 days was 24.7 mPa·s, and the viscosity retention rate was 67%; the initial viscosity of the mineralization was 32.1 mPa·s at 150° C. The degree of mineralization was 20 ten thousand mg/L (sodium ions were 71538 mg/L, calcium ions were 2000 mg/L, magnesium ions were 2000 mg/L), the viscosity after aging for 30 days was 1.9.6 mPa·s, and the viscosity retention rate was 61%.

Example 7

This example illustrates the polymer composite material prepared by the method of the present disclosure.

A polymer composite material was prepared in the same method as in Example 4, except that: the modified nano graphite prepared in Example 1 was replaced with the modified nano graphite prepared in Example 3.

As a result, a polymer composite material having a weight average molecular weight of 600 ten thousand g/mol and a degree of hydrolysis of 3.5% was obtained, and the structure thereof was represented by the formula (4), $R_8$, $R_9$ and $R_{10}$ each being a vinyl, n is 84507.

In addition, the apparent viscosity of the composite material prepared above was measured by a high temperature high pressure rheometer (shear rate 170 $s^{-1}$) to determine a concentration of 1.5%. The temperature is 130° C., the mineralization degree was 10 ten thousand mg/L (sodium ion were 35769 mg/L, calcium ion were 1000 mg/L, magnesium ion were 1000 mg/L), the initial viscosity was 50.9 mPa·s, the viscosity after aging for 30 days was 40.7 mPa·s, and the viscosity retention rate was 80%; the temperature was 130° C., the mineralization degree was 30 ten thousand mg/L (sodium ion were 107307 mg/L, calcium ion were 3000 mg/L, magnesium ion were 3000 mg/L), the initial viscosity was 49.7 mPa·s, the viscosity after aging for 30 days was 34.8 mPa·s, and the viscosity retention rate was 70%; the temperature was 150° C., the mineralization degree was 10 ten thousand mg/L (sodium ion were 35769 mg/L, calcium ion were 1000 mg/L, magnesium ion were 1000 mg/L), the initial viscosity was 35.0 mPa·s, the viscosity after aging for 30 days was 22 mPa·s, and the viscosity retention rate was 64%; the initial viscosity of 20 ten thousand mg/L (sodium ion were 71538 mg/L, calcium ion were 2000 mg/L, magnesium ion were 2000 mg/L) at 150° C., the viscosity after aging for 30 days was 18.6 mPa·s, and the viscosity retention rate was 60%.

Comparative Example 1

A polymer composite material was prepared in the same method as in Example 4, except that: the modified nano graphite prepared in Example 1 was not added to obtain a exiting polymer CP 1.

In addition, the apparent viscosity of the exiting polymer prepared as described above was measured using a high temperature high pressure rheometer (shear rate 170 $s^{-1}$) to determine a concentration of 1.5%. The temperature was 130° C. the mineralization degree was 10 ten thousand mg/L (sodium ion were 35769 mg/L, calcium ion were 1000 mg/L, magnesium ion were 1000 mg/L), the initial viscosity was 48.2 mPa·s, the viscosity retention rate after aging for 30 days was 21.7 mPa·s; the temperature was 130° C., the mineralization degree was 30 ten thousand mg/L (sodium ion were 107307 mg/L, calcium ion were 3000 mg/L, magnesium ion were 3000 mg/L), the initial viscosity was 45.2 mPa·s, the viscosity after aging for 30 days was 13.6 mPa·s, and the viscosity retention rate was 30%; the temperature was 150° C., the mineralization degree was 10 ten thousand mg/L (sodium ion were 35769 mg/L, calcium ion were 1000 mg/L, magnesium ion were 1000 mg/L), the initial viscosity was 33.1 mPa·s, the viscosity after aging for 30 days was 9.3 mPa·s, and the viscosity retention rate was 28%; the initial viscosity of 20 ten thousand mg/L (sodium ion were 71538 ma, calcium ion were 2000 mg/L, magnesium ion were 2000 ma) at 150° C., the viscosity after aging for 30 days was 6.1 mPa·s, and the viscosity retention rate was 20%.

Comparative Example 2

A polymer composite material was prepared in the same method as in Example 5, except that: the modified nano graphite prepared in Example 1 was not added to obtain a exiting polymer CP 2.

In addition, the apparent viscosity of the exiting polymer prepared as described above was measured using a high temperature high pressure rheometer (shear rate 170 s$^{-1}$) to determine a concentration of 1.5%. The temperature was 130'C the mineralization degree was 10 ten thousand ma (sodium ion were 35769 mg/L, calcium ion were 1000 mg/L, magnesium ion were 1000 ma), the initial viscosity was 42.9 mPa·s, the viscosity retention rate after aging for 30 days was 18.4 mPa·s; the temperature was 130° C., the mineralization degree was 30 ten thousand mg/L (sodium ion were 107307 mg/L, calcium ion were 3000 mg/L, magnesium ion were 3000 mg/L), the initial viscosity was 41.6 mPa·s, the viscosity after aging for 30 days was 11.2 mPa·s, and the viscosity retention rate was 27%; the temperature was 150° C., the mineralization degree was 10 ten thousand mg/L (sodium ion were 35769 mg/L, calcium ion were 1000 mg/L, magnesium ion were 1000 ma), the initial viscosity was 307 mPa·s, the viscosity after aging for 30 days was 8.6 mPa·s, and the viscosity retention rate was 28%; the initial viscosity of the mixture was 29.1 mPa·s at 150° C., the mineralization degree was 20 ten thousand ma (sodium ions were 71538 mg/L, calcium ions were 2000 mg/L magnesium ions were 2000 mg/L), the viscosity after aging for 30 days was 5.2 mPa·s, and the viscosity retention rate was 18%.

Comparative Example 3

A polymer composite material was prepared in the same method as in Example 6, except that: the modified nano graphite prepared in Example 1 was not added to obtain a exiting polymer CP 3.

In addition, the apparent viscosity of the exiting polymer prepared as described above was measured using a high temperature high pressure rheometer (shear rate 170 s$^{-1}$) to determine a concentration of 1.5%. The temperature was 130° C. the mineralization degree was 10 ten thousand mg/L (sodium ion were 35769 mg/L calcium ion were 1000 mg/L, magnesium ion were 1000 mg/L) the initial viscosity was 48.6 mPa·s, the viscosity retention rate was 40% when the viscosity was 194 mPa·s after aging for 30 days; the temperature was 130° C. the mineralization degree was 30 ten thousand mg/L, (sodium ion were 107307 mg/L, calcium ion were 3000 mg/L, magnesium ion were 3000 mg/L), the initial viscosity was 44.9 mPa·s, the viscosity after aging for 30 days was 9.9 mPa·s, and the viscosity retention rate was 22%; the initial viscosity of 10 ten thousand mg/L, (sodium ion were 35769 mg/L calcium ion were 1000 mg/L, magnesium ion were 1000 mg/L) at the temperature of 150° C., the viscosity after aging for 30 days was 31.5 mPa·s, the viscosity retention rate was 26%; the initial viscosity of the mixture was 28.9 mPa·s at 150° C., the mineralization degree was 20 ten thousand mg/L (sodium ions were 71538 mg/L, calcium ions were 2000 mg/L, magnesium ions were 2000 mg/L), the viscosity after aging for 30 days was 4.6 mPa·s, and the viscosity retention rate was 16%.

The viscosities of the composites prepared in Examples 4 to 7 and comparative examples 1 to 3, measured at 130° C. and 30 ten thousand mg/L mineralization using a high temperature high pressure rheometer, were summarized in Table 1.

TABLE 1

The results in table 1 show that the composite material prepared by the method of the present disclosure has high viscosity retention rate and good temperature resistance and salt tolerance.

| Number | Apparent viscosity (mPa · s) | Aging for 30 days viscosity (mPa · s) | Viscosity Retention (%) |
|---|---|---|---|
| P4 | 50.2 | 39.1 | 78 |
| P5 | 47.9 | 35.4 | 74 |
| P6 | 48.1 | 36.1 | 75 |
| P7 | 49.7 | 34.8 | 70 |
| CP1 | 45.7 | 13.6 | 30 |
| CP2 | 41.6 | 11.2 | 27 |
| CP3 | 44.9 | 9.9 | 22 |

The results in table 1 show that the composite material prepared by the method of the present disclosure has high viscosity retention rate and good temperature resistance and salt tolerance.

Application Example

The polymer composite materials prepared in Examples 4-7 and comparative examples 1-3 were used to high temperature and high salinity reservoirs, specifically: carrying out water flooding on the sand filling pipe of saturated oil to 80%, recording oil production, water production and pressure change, calculating primary water flooding recovery ratio, then injecting 0.6% polymer composite material (polymer system) solution into the sand filling pipe, then carrying out subsequent water flooding, recording oil production, water production and pressure change in the process, and calculating post-measure recovery ratio. In the present disclosure, it should be noted that the recovery ratio of primary water flooding refers to the ratio of the oil production of primary water flooding to the total saturated oil without adding the polymer composite materials prepared in examples 4 to 7 and comparative examples 1 to 3; the recovery factor after the measure refers to the ratio of the total oil production to the total saturated oil production after the measure when the polymer composite materials prepared in Examples 4 to 7 and comparative examples 1 to 3 are added; the incremental value of the recovery rate is the difference between the primary water drive recovery rate and the recovery rate after measures. In the present disclosure, the influence of different polymer systems on the oil displacement effect of the sand-packed pipe is represented by the increment of the recovery ratio, and the specific recovery ratio is shown in the table 2.

TABLE 2

| Number | Primary water drive recovery | Post-measure recovery | Enhanced recovery |
|---|---|---|---|
| P4 | 40.70 | 78.98 | 38.28 |
| P5 | 37.69 | 77.96 | 40.27 |
| P6 | 38.60 | 81.51 | 42.91 |
| P7 | 39.62 | 78.89 | 39.27 |
| CP1 | 39.40 | 50.23 | 10.83 |
| CP2 | 40.17 | 52.38 | 12.21 |
| CP3 | 37.64 | 51.24 | 13.60 |

As can be seen from the results in Table 2, the polymer composite material prepared by the method of the present disclosure can be used to high-temperature and high-salinity oil reservoirs to improve the recovery efficiency.

The above content describes in detail the preferred embodiments of the present, but the present is not limited thereto. A variety of simple modifications can be made to the technical solutions of the present within the scope of the technical concept of the present, including a combination of individual technical features in any other suitable manner, such simple modifications and combinations thereof shall also be regarded as the content disclosed by the present present, each of them falls into the protection scope of the present present,

The invention claimed is:

1. A polymer composite material having a structure represented by formula (4):

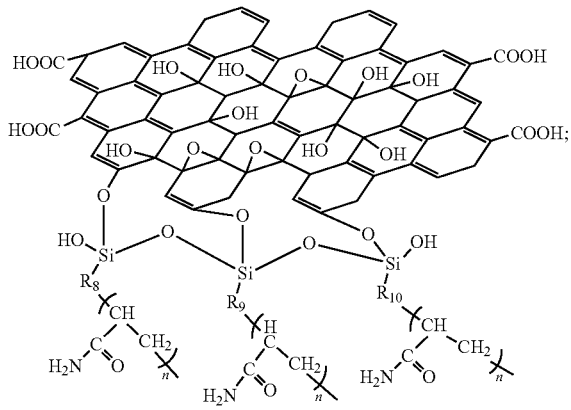

formula (4)

where $R_8$, $R_9$ and $R_{10}$ are derived from vinyl or propenyl; and n is an integer of 56000-150000.

2. The polymer composite of claim 1, wherein the weight average molecular weight of the polymer composite material is $400\text{-}1000 \times 10^4$.

3. The polymer composite of claim 1, wherein $R_8$, $R_9$ and $R_{10}$ are derived from vinyl;
wherein n is an integer of 70000-120000;
wherein the weight average molecular weight of the composite material is $500\text{-}800 \times 10$.

4. The polymer composite of claim 1, wherein the polymer composite is prepared by a method comprising contacting a modified nano graphite with the structure shown in the formula (1) with an acrylamide monomer in a redox initiation system to cause a polymerization reaction and obtain the polymer composite material shown in the formula (4);

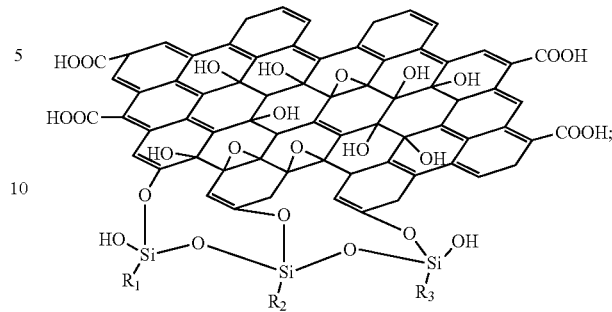

formula (1)

where $R_1$, $R_2$ and $R_3$ are vinyl or propenyl, respectively;

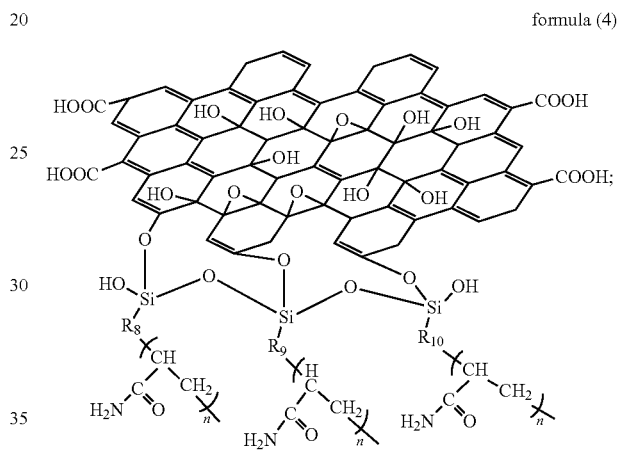

formula (4)

where $R_8$, $R_9$ and $R_{10}$ are derived from vinyl or propenyl, respectively; and n is an integer of 56000-150000.

5. The polymer composite of claim 4, wherein the redox initiation system comprises a reducing agent and an oxidizing agent, wherein the reducing agent comprises one or more selected from the group consisting of sodium bisulfite, sodium sulfite, and ferrous ions; and the oxidizing agent comprises one or more selected from the group consisting of ammonium persulfate, potassium persulfate and sodium persulfate.

6. The polymer composite of claim 4, wherein the redox initiation system comprises deionized water and based on 100 parts by weight of the deionized water, the oxidizing agent is 0.05 to 0.3 parts by weight, the modified nano graphite with the structure shown in the formula (1) is 0.01 to 0.05 parts by weight, and the acrylamide monomer is 20 to 30 parts by weight.

7. The polymer composite of claim 4, wherein the polymerization reaction conditions comprise: a temperature is 30-45° C. and a time of 2-5 h.

8. A method comprising: injecting the polymer composite material of claim 1 into a high temperature high salt reservoir.

* * * * *